Aug. 6, 1963 W. G. CROCKER 3,099,922
WAVE RING THERMOCOUPLE
Filed Sept. 18, 1959
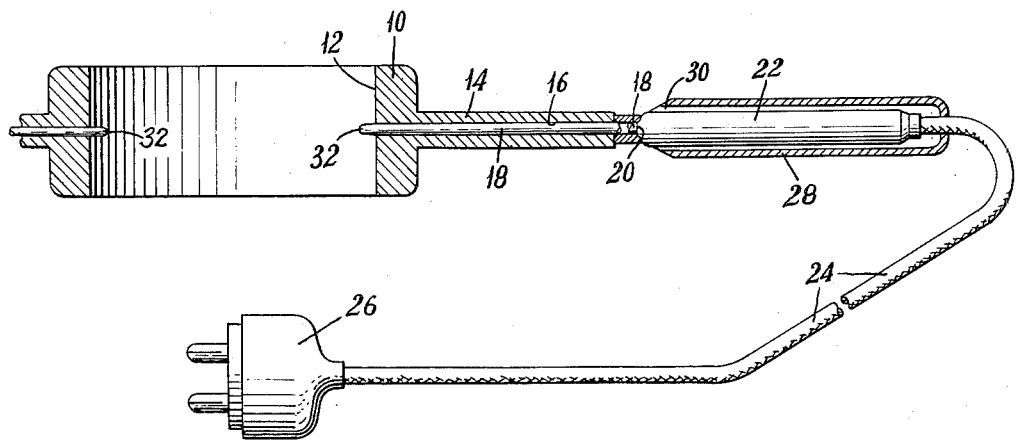
INVENTOR.
WILLIAM G. CROCKER
BY
*Walter C. Kehm*
ATTORNEY

United States Patent Office 3,099,922
Patented Aug. 6, 1963

3,099,922
WAVE RING THERMOCOUPLE
William G. Crocker, San Pedro, Calif., assignor to Union Carbide Corporation, a corporation of New York
Filed Sept. 18, 1959, Ser. No. 840,843
3 Claims. (Cl. 73—341)

This invention relates to temperature sensing devices and more particularly to temperature sensing devices for fluid masses in high pressure apparatus.

The device of my invention is useful in a wide variety of high pressure apparatus and, generally speaking, in all apparatus comprising inter-connected sections of pipe. It is particularly useful in apparatus comprising sections of thick-walled high strength pipe interlocked in series by flanged couplings, known in the art as "wave rings," to form a tubular structure for apparatus wherein fluid material flows under great pressures and at high temperatures.

Close control over both temperature and pressure of the material within the tubular structure is essential in many processes. To withstand the necessarily high pressures, heavy-walled pipe, i.e., pipe having a relatively small bore with respect to its diameter, must be employed. The use of heavy-walled pipe, however, makes measurement of temperatures within the structure a difficult task. A method heretofore used to measure fluid mass temperatures employs thermocouples clamped to the outside of the pipe. Obviously, this method will not be particularly sensitive. Because of wall thickness, measured temperatures are generally well below actual internal temperatures. Also, there is a considerable time lag in recordation of temperature changes. The external thermocouple method records temperatures which are quantitatively inaccurate with respect to internal temperatures and qualitatively inaccurate with respect to the time of sensing changes (dynamic response).

Other means devised for obtaining measurements of internal temperatures include a forged steel thermocouple block containing a heavy thermowell with a thermocouple inserted therein. This device is inserted in the apparatus at the desired monitoring points. Material passes through the block, moving in contact with the thermowell. The thermocouple senses material temperature through the thermowell wall. Although the accuracy and rapidity of temperature measurement is considerably enhanced by this method over external measurement methods, quantitative and qualitative inaccuracies attributable to the thick thermowell wall and the distance intervening between the thermocouple and the fluid mass are not eliminated.

The greatest drawback to the use of the thermocouple block, however, is the need for placing a high pressure seal on either side of the thermocouple block between it and adjacent structures. Bearing in mind that usable pressures are only those which the weakest point in the apparatus can withstand, the introduction of two additional seals at a temperature monitoring point obviously portends increased apparatus failure. Normally, that is, in the absence of temperature monitoring, an apparatus would require high pressure gaskets (the wave rings above referred to) only at junctions between successive pipe sections. Structures equipped with thermocouple blocks, however, have two additional seals, two additional weak points and potential failure spots for each thermocouple block used. Thus, the presence of thermocouple blocks and the two accompanying high pressure seals limits performance of the apparatus.

A modification of the thermocouple block method has been developed which overcomes the first of the above-described difficulties, namely, accuracy of indicated temperatures and sensitivity of dynamic response. This is achieved by eliminating the thermowell formerly used to house the thermocouple and permitting the thermocouple to project beyond the inner wall of the tubular apparatus components into the fluid mass of material flowing therein. To do this, it is essential to sheath the thermocouple wires with a thin covering of stainless steel. Of methods heretofore known, the sheathed thermocouple method provides the greatest accuracy and the most sensitive dynamic response in temperature measurement of fluid masses under high pressure.

But the sheathed thermocouple is fitted in a thermocouple block. Hence, all of the problems associated with the above-described less sensitive thermocouple block arrangements, as a result of the necessary use of two high pressure seals therewith, are still present in the modified thermocouple block arrangement. Therefore, although heightening accuracy and sensitivity of measurement, the sheathed thermocouple block device does not solve the most pressing problem, namely, the presence of numerous extra high pressure seals and potential weak spots in the apparatus.

It is an object, therefore, of the present invention, to provide a means for sensitively and accurately ascertaining the temperatures of the fluid mass within high pressure apparatus without weakening such apparatus by the introduction of such means.

In is another object of the present invention to provide a temperature sensing device assembly which does not require the introduction of additional high pressure seals.

It is a further object to provide a temperature sensing device which exhibits accuracy and dynamic response in temperature measurement superior to thermocouple block devices heretofore known.

It is a still further object to provide a temperature sensing device wherein heat loss due to conduction is reduced to a minimum.

These and other objects are achieved in accordance with the present invention by the use, in apparatus comprising sections of interconnected pipe, of a wave ring having a flange with at least one radial bore therein and in each bore a sheathed thermocouple extending into the apparatus.

In the drawings, the single FIGURE is a sectional view partly in elevation illustrating a preferred embodiment of the device of this invention.

In detail, the device comprises a wave ring or flanged coupling consisting of a body 10 having an inner wall 12. The wave ring is adapted to receive pipes on either side thereof and forms a continuation of a tubular structure or apparatus. Flange 14 on the wave ring has a bore 16 wherein a sheathed thermocouple 18 is soldered. The end 20 of sheathed thermocouple 18 remote to wall 12 is connected at housing 22 to braided shield leadwire 24 terminating a quick-disconnect type plug 26 adapted for insertion in a receptacle near the joint formed by the wave ring and adjacent tubular structures. A tubular support 28, shown in section, independently supported, is fixed around housing 22 to prevent disruption of the fine thermocouple wires within sheathed thermocouple 18 during installation or operation. The lower portion 30 of tubular support 28 serves to prevent the sheathed thermocouple 18 from entering completely into the apparatus.

The wave ring is suitably made of stainless steel. Flange 14 is made as thin as practicable to avoid the wave ring being extruded from between the ends of the two pipe sections joined by the wave ring. It has been found that increased flange thickness tends to make the wave ring more susceptible to this extrusion.

The thermocouple itself comprises a number of fine wires of iron-constantan or similar suitable material and is enclosed in a sheath of stainless steel about $\frac{1}{16}''$ or less in diameter having walls of approximately 0.010 to 0.015 inch thick. The particular thermocouple used is not critical, nor is there a narrowly critical limitation on sheath diameter or wall thickness. The limiting factor with regard to the sheath diameter is the thickness of the flange which must be bored out to receive the sheathing. As indicated, flange thickness is desirably kept to a minimum.

The thermocouple can be soldered in the bore 16 or kept fixed therein by other means such as sweating. What is required is that the thermocouple be fixed firmly enough to resist the pressure developed within the apparatus. It is evident that the very small diameter of the sheaths provides little surface for pressure to work against. Where solder is used, silver has been found to be highly satisfactory.

The tips 32 of sheathed thermocouples, such as that indicated by numeral 18 extending into the tubular structure project from the wall 12 of the wave ring a distance ranging from 1/16 to 1/2 of the inside diameter. Experiments have shown that with an iron-constantan thermocouple sheathed in 1/16" diameter stainless steel, an insertion distance of 1/4 the inside diameter provides a dynamic responsive superior to that achieved with the standard thermocouple block heretofore employed. Hence, this embodiment of the invention is preferred. It has been found that an increase in the insertion distance from 1/4 to 1/2 the inside diameter does not appreciably increase sensitivity or dynamic response. Also, at insertion distances greater than about 1/4 the inside diameter, the tip of the sheathed thermocouple bends in the flowing mass and is more prone to breaking. Hence, the sensitivity achieved at insertion greater than 1/2 the inside diameter is offset by greater fragility and increased chance of failure. At the other end of the suitable size range 1/16 of the inside diameter, the response is only 50% as great as the response at 1/8 and 1/4 thereof indicating that a sharp drop-off in sensitivity is experienced as the tip 32 protrudes less than 1/16 of the inside diameter into the fluid mass. At less than 1/16 inside diameter insertion, the accuracy and thermal response are reduced because the relatively slow moving film immediately adjacent the inside pipe wall covers the sheathed thermocouple tip and prevents measurement of the majority of the fluid mass.

What is claimed is:

1. A device for sensing the temperature of a fluid mass within high pressure apparatus that includes successive inter-communicating pipe sections adapted to be spaced apart by a flanged coupling interposed between adjacent ends of the successive pipe sections as a continuation thereof, said device comprising a flanged coupling having a flange with a radial bore therein and fixed within said bore in contact with the fluid mass a temperature responsive means comprising a sheathed thermocouple fixed firmly enough to resist the pressure within the apparatus extending into said apparatus a distance equal to 1/16 to 1/2 the inside diameter of said pipe sections.

2. The device claimed in claim 1 wherein the temperature responsive means extends into said apparatus a distance equal to approximately 1/4 the inside diameter of said pipe sections.

3. A device for sensing the temperature of a fluid mass within high pressure apparatus that includes successive inter-communicating pipe sections adapted to be spaced apart by a flanged coupling interposed between adjacent ends of the successive pipe sections as a continuation thereof, said device comprising a flanged coupling having a flange with a plurality of radial bores therein and fixed within each of said bores a temperature responsive means comprising a sheathed thermocouple fixed firmly enough to resist the pressure within the apparatus in contact with the fluid mass extending into said apparatus a distance equal to approximately 1/4 the inside diameter of said pipe sections.

References Cited in the file of this patent
UNITED STATES PATENTS

| | | |
|---|---|---|
| 368,882 | Laubeaf | Oct. 22, 1906 |
| 1,349,409 | Crawford | Aug. 10, 1920 |
| 1,902,932 | Zubaty | Mar. 28, 1933 |
| 2,037,575 | Hamilton | Apr. 14, 1936 |
| 2,197,564 | Yaglon | Apr. 16, 1940 |
| 2,588,840 | Howland | Mar. 11, 1952 |

OTHER REFERENCES

Franz: N.A.C.A. Tech Memo No. 953, September 28, 1940.